United States Patent
Byun et al.

(10) Patent No.: US 10,128,926 B2
(45) Date of Patent: Nov. 13, 2018

(54) METHOD AND DEVICE FOR TRANSMITTING SIGNAL

(71) Applicant: LG ELECTRONICS INC., Seoul (KR)

(72) Inventors: Ilmu Byun, Seoul (KR); Heejeong Cho, Seoul (KR); Hyunsoo Ko, Seoul (KR); Hyeyoung Choi, Seoul (KR); Kungmin Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/510,215

(22) PCT Filed: Oct. 17, 2014

(86) PCT No.: PCT/KR2014/009775
§ 371 (c)(1),
(2) Date: Mar. 9, 2017

(87) PCT Pub. No.: WO2016/060304
PCT Pub. Date: Apr. 21, 2016

(65) Prior Publication Data
US 2017/0288755 A1    Oct. 5, 2017

(51) Int. Cl.
*H04B 7/06*     (2006.01)
*H04W 72/04*    (2009.01)
(Continued)

(52) U.S. Cl.
CPC ........... *H04B 7/0617* (2013.01); *H04B 7/063* (2013.01); *H04B 17/00* (2013.01);
(Continued)

(58) Field of Classification Search
CPC ..... H04B 7/0617; H04B 7/06; H04W 72/042; H04W 72/1289; H04W 72/04; H04W 72/0406; H04W 72/08; H04W 72/082
See application file for complete search history.

(56) References Cited

U.S. PATENT DOCUMENTS

2013/0194950 A1    8/2013  Haghighat et al.
2013/0223373 A1*   8/2013  Damnjanovic ..... H04W 72/082
                                                        370/329
(Continued)

FOREIGN PATENT DOCUMENTS

KR    1020140044390    4/2014
WO    2014133752       9/2014

OTHER PUBLICATIONS

PCT International Application No. PCT/KR2014/009775, International Search Report dated Jun. 25, 2015, 2 pages.
(Continued)

*Primary Examiner* — Betsy Deppe
(74) *Attorney, Agent, or Firm* — Lee Hong Degerman Kang Waimey

(57) ABSTRACT

A method for transmitting a signal that includes the steps of: determining the beam width of a beam to be transmitted; determining, on the basis of the beam width, relative narrowband transmit power (RNTP) information indicating whether a transmission power of at least a predetermined critical value is transmitted to a predetermined resource block; transmitting the RNTP information to an adjacent cell; and transmitting the generated beam to the resource block according to the RNTP information. Also provided is a method for configuring an RNTP value for controlling inter-cell interference in a communication system.

9 Claims, 9 Drawing Sheets

(51) Int. Cl.
*H04W 72/12* (2009.01)
*H04B 17/00* (2015.01)
*H04B 1/38* (2015.01)

(52) U.S. Cl.
CPC ..... *H04W 72/042* (2013.01); *H04W 72/1289* (2013.01); *H04B 1/38* (2013.01)

(56) References Cited

U.S. PATENT DOCUMENTS

2013/0242885 A1* 9/2013 Zhu .................. H04W 72/082
 370/329
2014/0169279 A1 6/2014 Song et al.

OTHER PUBLICATIONS

Fujitsu, "Consideration on interference coordination for EPDCCH in small cell", R1-133136, 3GPP TSG RAN WG1 Meeting #74, Aug. 2013, 4 pages.

\* cited by examiner

FIG. 2
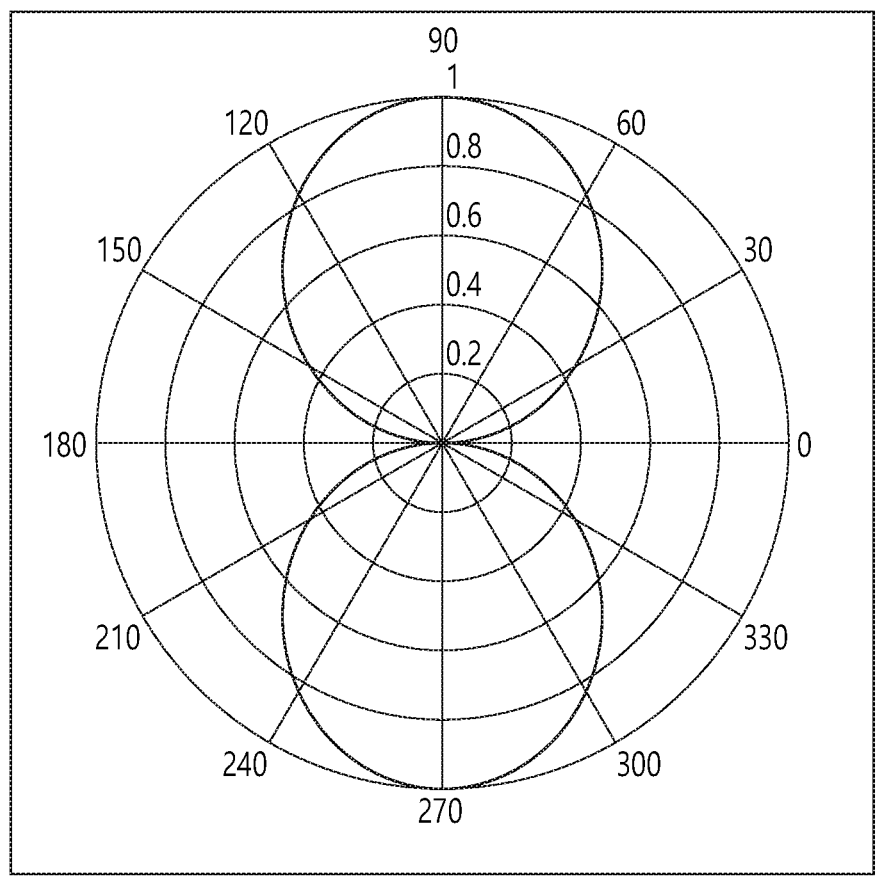
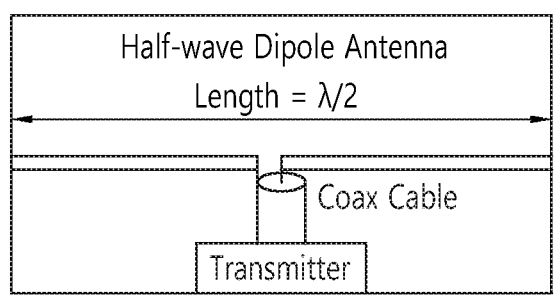

FIG. 3
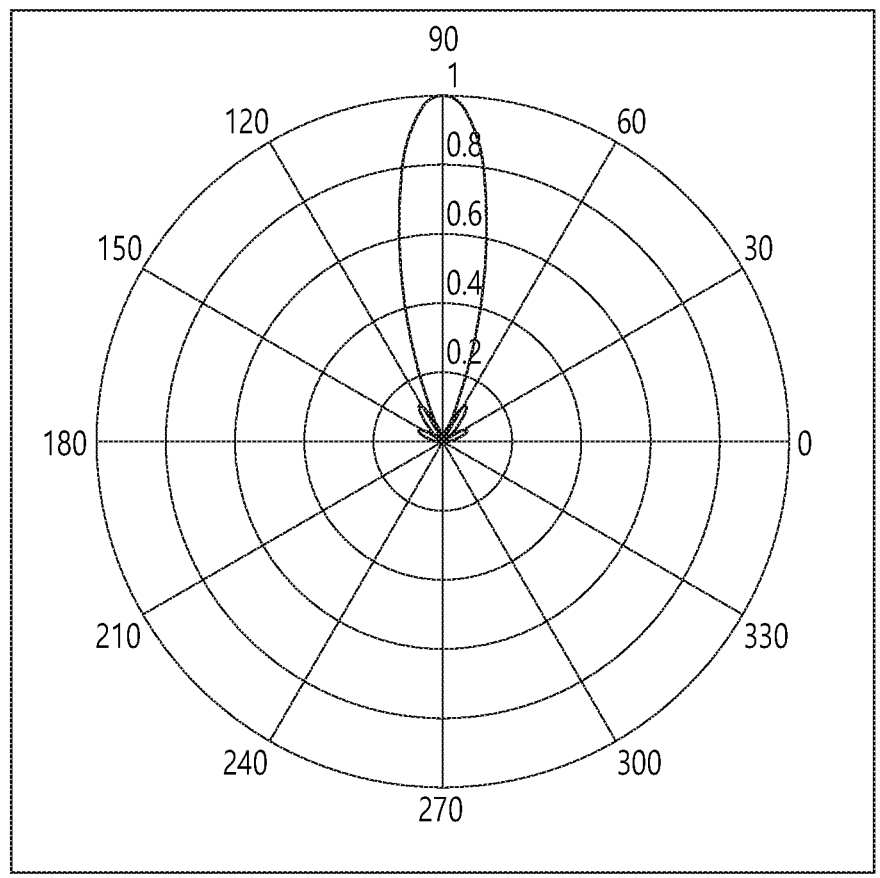
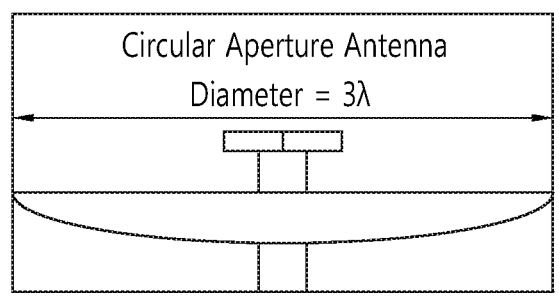

FIG. 4
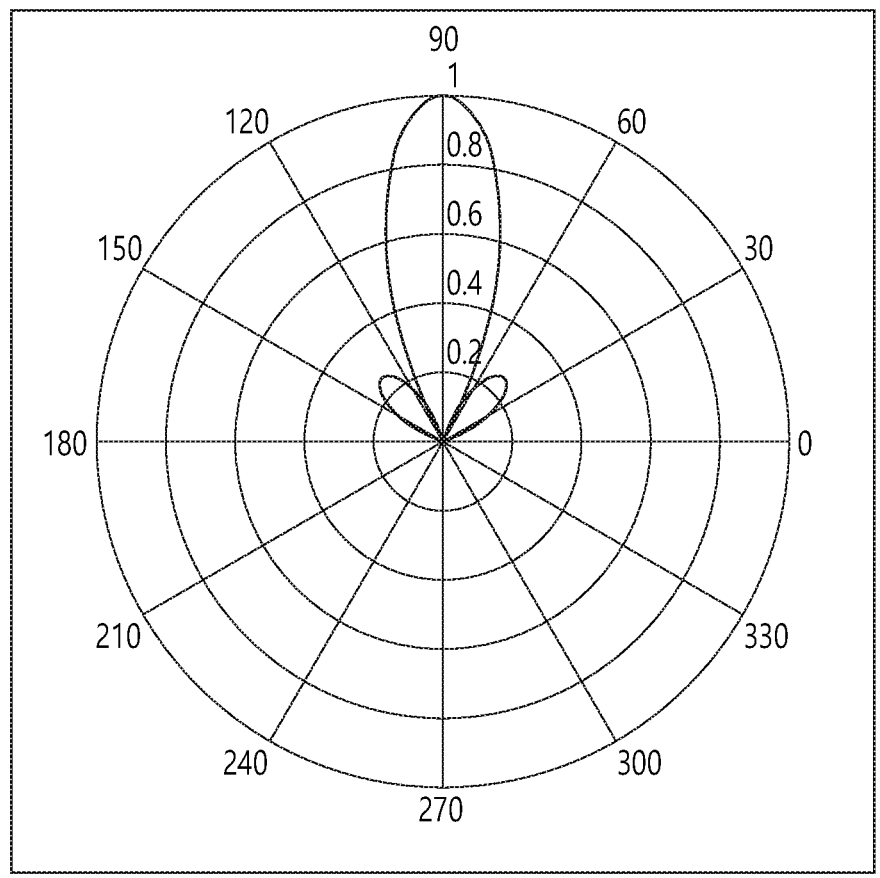
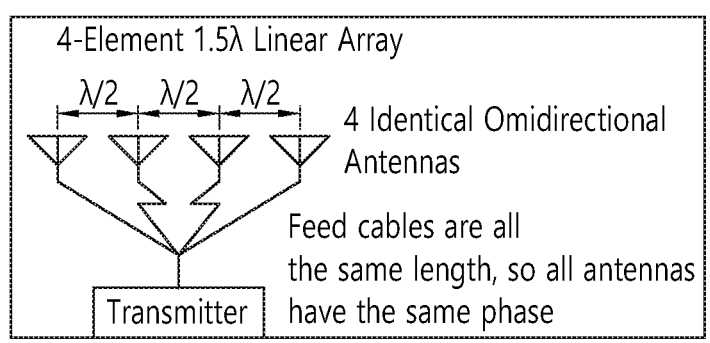

METHOD AND DEVICE FOR TRANSMITTING SIGNAL

CROSS-REFERENCE TO RELATED APPLICATIONS

This application is the National Stage filing under 35 U.S.C. 371 of International Application No. PCT/KR2014/009775, filed on Oct. 17, 2014, the contents of which are hereby incorporated by reference herein in its entirety.

BACKGROUND OF THE INVENTION

Field of the Invention

The present invention relates to a method and apparatus for transmitting a signal, and more particularly, to a method and apparatus for configuring an RNTP for controlling inter-cell interference through a beam width adjustment.

Related Art

Recently, commercialization of the long term evolution (LTE) system, which is the next generation of wireless communication systems, has been supported earnestly. After the necessities were recognized that mass data service is to be supported in high-quality in response to users' request as well as voice service while ensuring users' mobility, the trend is that such an LTE system has been more rapidly expanded. The LTE system provides low transmission delay, high transmission rate, high system capacity and coverage improvement.

Owing to the advent of such a high-quality service, needs for wireless communication service have been abruptly increased. In order to actively cope with such a situation, more than anything else, the capacity of the communication system should be increased. The way for increasing the communication capacity in the wireless communication environment may include a method for newly finding available frequency band and a method for increasing efficiency for the limited resource.

As a method for increasing efficiency of the limited resource, a technique for increasing a transmission capacity, so-called the multiple antenna transmission and reception technique has been vigorously developed with a great attention, which takes a diversity gain by additionally securing the spatial area for the resource utilization by mounting multiple antennas on a transceiver or increases a transmission capacity by transmitting data in parallel through each antenna.

In the multiple antenna system, the beamforming and the precoding may be used for increasing the Signal-to-Noise Ratio (SNR). In the closed-loop system that may use feedback information in a transmission end, the beamforming and the precoding are used for maximizing the SNR through the corresponding feedback information.

SUMMARY OF THE INVENTION

An embodiment of the present invention is to propose a method for configuring a relative narrowband transmit power (RNTP) value in order to perform the inter-cell interference control in the communication system to which the flexible beamforming is applied.

Further embodiment of the present invention is to propose a method of configuring an RNTP value by considering an array factor or a beam width.

Another embodiment of the present invention is to propose a method of configuring an RNTP value by considering an antenna gain.

Still another embodiment of the present invention is to propose a method of configuring an RNTP value by considering an antenna gain and a transmission power together.

A method for transmitting a signal according to the present invention may include determining a beam width that is going to be transmitted, determining relative narrowband transmit power (RNTP) information that represents whether a transmission power greater than a preconfigured threshold value is transmitted to a preconfigured resource block based on the beam width, and transmitting the RNTP information and transmitting a generated beam to the resource block according to the RNTP information.

The method may further include calculating an array factor that includes the beam width and information of a change of a maximum antenna gain according to the beam width, and the step of determining the RNTP information may be determined by comparing the array factor with a preconfigured array factor.

The step of determining the RNTP information may be determined by comparing a half power beam width in which a maximum power of a beam becomes a half with a preconfigured half power beam width.

The method may further include calculating an array gain for the beam, and the step of determining the RNTP information may be determined by comparing the array gain with a preconfigured array gain.

The step of calculating the array gain for the beam may perform a multiplication of a single antenna gain for transmitting a beam by the beam width and an array factor that includes information of change of a maximum antenna gain according to the beam width.

The method may further include calculating an array gain for the beam and a gain energy induced by a multiplication of the array gain for the beam by a maximum energy for a resource block, and the step of determining the RNTP information may be determined by comparing the gain energy with preconfigured gain energy.

The step of calculating the gain energy may include calculating the array gain by performing a multiplication of a single antenna gain for transmitting the beam by the beam width and an array factor that includes information of change of a maximum antenna gain according to the beam width.

A weighting may be attributed to the array gain in calculating the gain energy.

Advantageous Effects

According to the present invention, a method is provided for configuring a relative narrowband transmit power (RNTP) value in order to perform the inter-cell interference control in the communication system to which the flexible beamforming is applied.

Through this, the mobility of the users of the interior cell may be secured.

BRIEF DESCRIPTION OF THE DRAWINGS

FIG. 2 illustrates a radiation pattern of the half-wave dipole antenna.

FIG. 3 illustrates a radiation pattern of a circular aperture antenna, such as a satellite receiving antenna.

FIG. 4 illustrates a radiation pattern of a linear array antenna.

DESCRIPTION OF EXEMPLARY EMBODIMENTS

Figure 1:
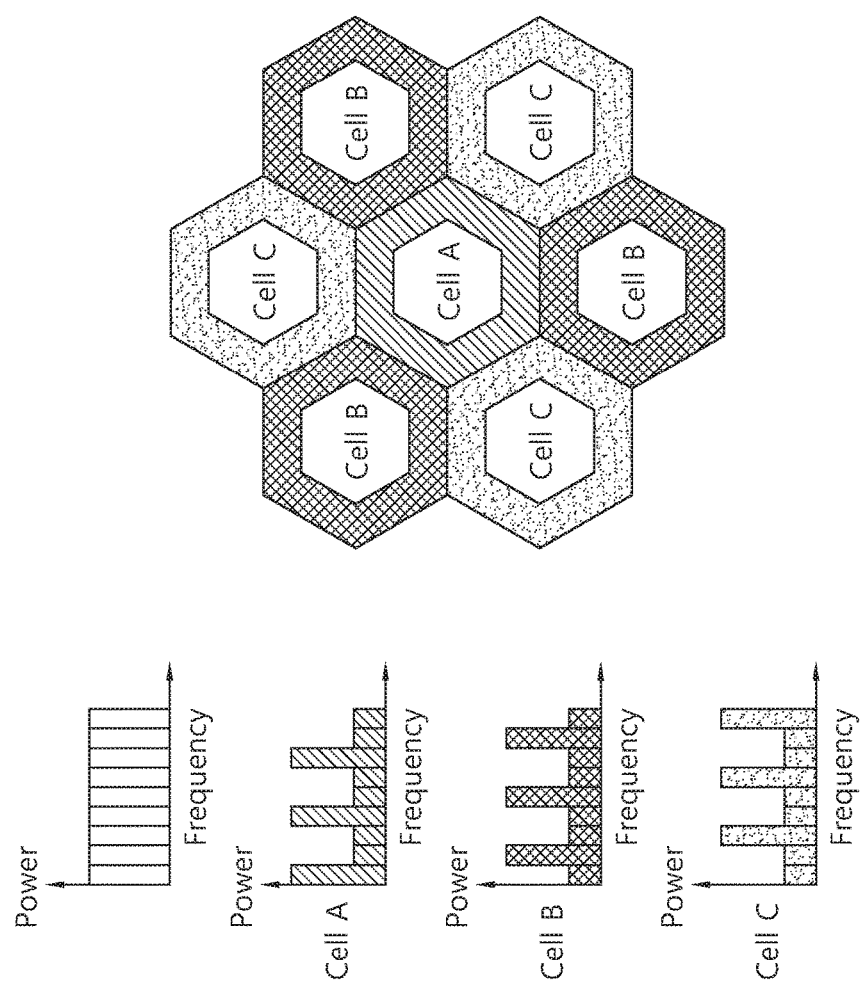
FIG. 1 is a diagram for describing the inter-cell interference coordination in the LTE system.

The present invention can be modified in various forms, and specific embodiments thereof will be described and shown in the drawings. However, the embodiments are not intended for limiting the invention. The terms used in the following description are used to merely describe specific embodiments, but are not intended to limit the invention.

Hereinafter, the preferred embodiment of the present invention now will be described in detail with reference to the accompanying exemplary drawings in this specification. In attaching reference numerals to elements in each drawing, it should be understood that the same reference numeral is used for the same element even if the element is shown in different drawings. In addition, in case that the detailed description for the related known elements and functions is determined to obscure the inventive concept in this specification, the redundant description for the same element will be omitted.

In addition, the present specification describes wireless communication network as an object, the tasks performed in the wireless communication network may be performed during the process of controlling the network in the system (for example, a base station) that controls the corresponding wireless communication network and transmitting data, or performed by the user equipment that is coupled to the corresponding wireless network.

FIG. 1 is a diagram for describing the inter-cell interference coordination in the LTE system.

In the LTE system, each cell may be divided into interior and exterior. In the interior cell in which a user undergoes interference of low level and low power is required for the communication with a serving cell, the frequency reuse factor is 1.

In the case of the exterior cell, when the cell schedules a user to a part of given band, the system capacity may be optimized for the case that neighboring cells do not transmit anything or the case that neighboring cells transmit low power to the users existed inside of adjacent cells in order to avoid strong interference that may occur for the user scheduled in the first cell.

Such a limitation brings about the result of increasing the frequency reuse rate in a cell-edge, which is known as the partial frequency reuse as shown in FIG. 1.

As shown in FIG. 1, each of the cells A, B and C may be divided into interior area and exterior area, and the frequency resource for each cell-edge is allocated to a cell in order not to be overlapped in an adjacent cell. In the case that a specific frequency resource is allocated to the exterior area of cell A, the corresponding frequency resource is not allocated in cell B and cell C. And in the case that a specific frequency resource is allocated to the exterior area of cell B, the corresponding frequency resource is not allocated in cell A and cell C. In the same way, in the case that a specific frequency resource is allocated to the exterior area of cell C, the corresponding frequency resource is not allocated in cell A and cell B.

In order to coordinate the scheduling for other cells in such a way, a communication is required between neighboring cells. In the case that the neighboring cells are managed by the same base station (e.g., eNodeB), the coordinated scheduling plan may be performed without request for a standardized signaling. However, in the case that the neighboring cells are managed by different base stations, particularly, in the multivendor networks, the standardized signaling is important.

In LTE, it is assumed that the Inter-Cell Interference Coordination (ICIC) is managed in the frequency domain, rather than in the time domain, and the signaling between base stations is designed for supporting it. This is because the time domain coordination may interfere with the operation for the HARQ process like the uplink in which the synchronous Hybrid Automatic Repeat reQuest (HARQ) is used.

Regarding a downlink transmission, the bitmap expressed by a Relative Narrowband Transmit Power (RNTP) may be exchanged through an X2 interface. Each bit of an RNTP indicator that corresponds to a single resource block in the frequency domain is used for notifying whether to maintain the transmission power for the resource block below a specific upper limit to neighboring base stations. Such an upper limit and the term of validity may be preconfigured.

For example, when the RNTP indicator is 1, which represents a state that the transmission power is maintained to a specific resource block, that is, a signal transmission, and when the RNTP indicator is 0, which represents a state that a signal is not transmitted to the corresponding resource block, that is, a state that beamforming is not performed.

Accordingly, the degree of interference anticipated in each resource block may be considered when neighboring cells schedule a user in their own cells.

In the case that a base station receives the information that the transmission power of the resource block in a neighboring cell is high, the follow-up operation is not consistent. Accordingly, a certain degree of freedom is allowed for performing the scheduling algorithm. However, a typical operation may have a user in a cell-edge avoid scheduling for the resource block of which transmission power is high.

In the definition of an RNTP indicator, the transmission power per antenna port may be normalized by the maximum output power of a base station or a cell. This is because the cell that has small maximum output power owing to its small size may undergo greater interference than the cell that has great maximum output power that corresponds to the cell of which size is great.

The determination for the RNTP indicator may be performed by Equation 1.

$$RNTP(n_{PRB}) = \begin{cases} 0 & \text{if } \frac{E_A(n_{PRB})}{E^{(p)}_{max\_norm}} \leq RNTP_{threshold} \\ & \text{if no promise about the} \\ 1 & \text{upper limit of } \frac{E_A(n_{PRB})}{E^{(p)}_{max\_norm}} \text{ is made} \end{cases}$$ [Equation 1]

In Equation 1, $E_A(n_{PRB})$ represents the maximum intended energy per resource element (EPRE) of a UE-specific physical downlink shared channel (PDSCH) REs for an orthogonal frequency division multiplexing (OFDM)

symbol that does not include a reference signal (RS) in the physical resource block for antenna port p during the next specific time duration, and $n_{PRB}$ represents the number of physical resource blocks. $n_{PRB}$ may have a value from 0 to $N_{RB}^{DL}-1$. $RNTP_{threshold}$ may have a value belonged to $\{-\infty, -11, -10, -9, -8, -7, -6, -5, -4, -3, -2, -1, 0, +1, +2, +3\}[dB]$ ($RNTP_{threshold} \in \{-\infty, -11, -10, -9, -8, -7, -6, -5, -4, -3, -2, -1, 0, +1, +2, +3\}[dB]$).

In addition, in Equation 1, $E^{(p)}_{max\_nom}$ may be expressed as Equation 2.

$$E^{(p)}_{max\_nom} = \frac{P^{(p)}_{max} \cdot \frac{1}{\Delta f}}{N_{RB}^{DL} \cdot N_{SC}^{RB}} \quad \text{[Equation 2]}$$

In Equation 2, $\Delta f$ represents a subcarrier spacing, and $N_{RB}^{DL}$ represents a Downlink bandwidth configuration. And $N_{SC}^{RB}$ represents a resource block size in the frequency domain, expressed as the number of subcarriers.

According to Equation 1, the RNTP indicator becomes 0 when the energy $$\frac{E_A(n_{PRB})}{\left(E^{(p)}_{max\_nom}\right)}$$

of a normalized RE is equal or smaller than $RNTP_{threshold}$ which is preconfigured, and becomes 1 in the case that there is no rule in the upper limit of the energy $$\frac{E_A(n_{PRB})}{\left(E^{(p)}_{max\_nom}\right)}$$

of a normalized RE. That is, the RNTP indicator may become 1 when $$\frac{E_A(n_{PRB})}{\left(E^{(p)}_{max\_nom}\right)}$$

is greater than $RNTP_{threshold}$.

Meanwhile, a transmission antenna generates an electromagnetic wave which is strong in a specific direction in comparison with other directions. The representation of field strength for a direction is referred to as a radiation pattern. The radiation pattern has always the same shape in a transmission and a reception.

The electromagnetic wave measured on a point far away from the antenna corresponds to the summation of the radiation rays radiated from all parts of the antenna. Each of the small parts of the antenna radiates waves that have different widths and phases, and such radiation wave moves different distances from the point where a receiver is located. the gain of such a radiation wave may be increased in some direction and may be decreased in some other direction.

A half-wave dipole antenna is a simple half-way antenna in which a wire is connected to a disconnected central portion for cable connection. FIG. 2 illustrates a radiation pattern of the half-wave dipole antenna.

A directional antenna is designed to have gain in only one direction and to have loss in other directions. As an antenna increases in size, directivity thereof is created. A wave radiated from an antenna travels a long distance with directivity and may be more easily controlled when given a directional radiation pattern which is constructive interference or unconstructive interference.

To be extremely simplified, a satellite receiving antenna is considered to be a circular surface from which the same electromagnetic waves are radiated in all parts. FIG. 3 illustrates a radiation pattern of a circular aperture antenna, such as a satellite receiving antenna.

Referring to FIG. 3, a beam with a narrow width having a high gain is disposed at the center of the radiation pattern. As the diameter of the antenna increases according to a wavelength, the width of the central beam becomes gradually narrow. Small beams called side lobes appear on both sides of the central beam. The direction of a signal with the signal strength of 0 may be expressed as "nulls."

A simple directional antenna is constructed from a linear array of small radiating antenna elements, and the same signal with the same amplitude and the same phase is provided from one transmitting end to each antenna element. As the entire width of the array increases, the central beam becomes narrow; as the number of antenna elements increases, side lobes become small FIG. 4 illustrates a radiation pattern of a linear array antenna. FIG. 4 shows a radiation pattern of four small antenna elements disposed at an interval of 1λ/2.

Meanwhile, the radiation pattern of the linear array may be represented as a radiation pattern of a single antenna multiplied by an array factor (AF) representing impact of constructive interference and destructive interference of each antenna signal. That is, the array factor represents a change in maximum antenna gain according to a beam width.

Figure 5:
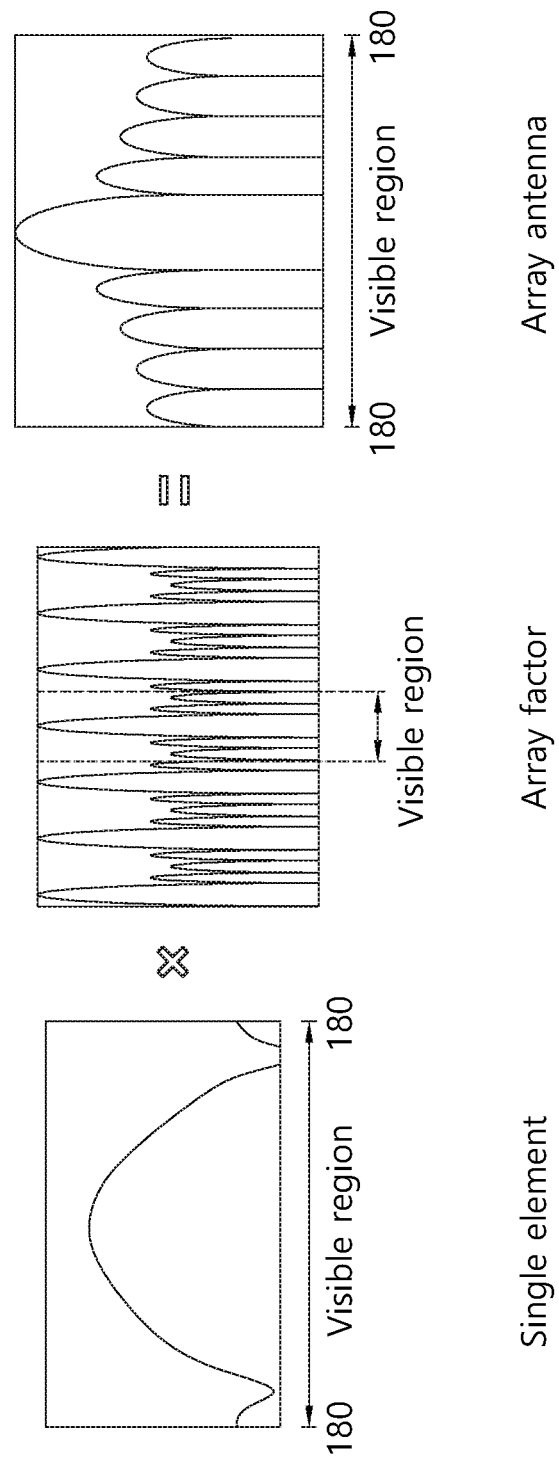
FIG. 5 illustrates a process of obtaining a radiation pattern of a linear array antenna.

FIG. 5 illustrates a process of obtaining a radiation pattern of a linear array antenna. As shown in FIG. 5, an antenna gain may be obtained by multiplying a radiation pattern of a single antenna (single element) ($E_r(\omega)$) by an array factor.

An array factor may be changed based on the number of antennas forming an antenna array, the distance between antennas, and a weight by which each antenna is multiplied. The array factor may be represented as Equation 3.

$$AF(\theta) = \sum_{n=1}^{N_T} w_n e^{j(n-1)(kd\cos\theta+\phi)} \quad \text{[Equation 3]}$$

In Equation 3, $N_T$ denotes the number of antennas, $w_n$ denotes a weight for each antenna, d denotes the distance between antennas, $k=2\pi/\lambda$ denotes a wave number, $\theta$ denotes an angle from a directing point of an antenna array, and $\varphi$ denotes a phase offset.

That is, when the heading direction ($\theta$) of a beam from an antenna array is 0 and antennas are disposed at equal intervals, array factor values are expressed to be laterally symmetrical based on the heading direction.

In the case that a base station transmits a signal in a direction rotated through x degrees based on a boresight to which the antenna heads, an antenna gain at a directing point of a beam may be represented as $E_r(x)AF(0)$. Further, a beam gain at a point rotated through y degrees based on the directing point of the beam may be represented as $E_r(x+y)AF(y)$ As shown in FIG. 5, a window (vision region) of an AF may be shifted according to θ applied to the AF, and a final antenna gain is obtained by multiplying the window and a corresponding antenna radiation pattern.

Meanwhile, a huge MIMO system receives attention as a core technique of the next generation communication system such as 5G, but has a disadvantage that the beam width decreases as the number of antennas increases. The degree of decrease of the antenna may be comprehended by a half power beam width (HPBW). The HPBW means a radiation angle of a beam of which maximum power decreases to more than a half.

When the number of isotropic antennas arranged in a line is $N_T$, the interval between antennas is d, and the wavelength of a radio wave is $\lambda$, the HPBW is represented in Equation 4.

$$HPBW = \frac{\lambda}{(N_T - 1)d} \text{ radian} \quad \text{[Equation 4]}$$

Through Equation 4, it is identified that the HPBW is linearly decreased according to the number of antennas. When the interval d between antennas is $\lambda/2$, Equation 4 may be arranged as Equation 5.

$$HPBW = \frac{2}{(N_T - 1)} \text{ radian} \quad \text{[Equation 5]}$$

When the distance between a base station and a user equipment is x (meters), the distance y (meters) of a beam being spread horizontally on point x may be expressed as Equation 6.

$$y = 2x \tan\left(\frac{HPBW}{2}\right) = 2x \tan\left(\frac{1}{N_T - 1}\right) \quad \text{[Equation 6]}$$

When the number of antennas of the base station is 4 and distance x between the user equipment and the base station is 20 m and 500 m, y becomes 13.85 m and 346 m, respectively, when it is calculated through Equation 6. In addition, when the number of antennas of the base station is 16 and distance x between the user equipment and the base station is 20 m and 500 m, y becomes 2.7 m and 67 m, respectively.

Since it means that the beam width is narrower as y becomes smaller and a degree of error according to the change of beam direction as the beam width becomes narrower, it is identified that more accurate beamforming is required as the number of antennas increases and the distance between the base station and the user equipment becomes closer.

In addition, through the huge MIMO system, high beam gain is obtainable using many numbers of antennas, but there is a disadvantage that the beam width decreases as an opposite effect of the high beam gain. In order to solve it, the technique of adjusting the beam width flexibly is proposed by considering a moving velocity and a moving direction of a user equipment.

Figure 6:
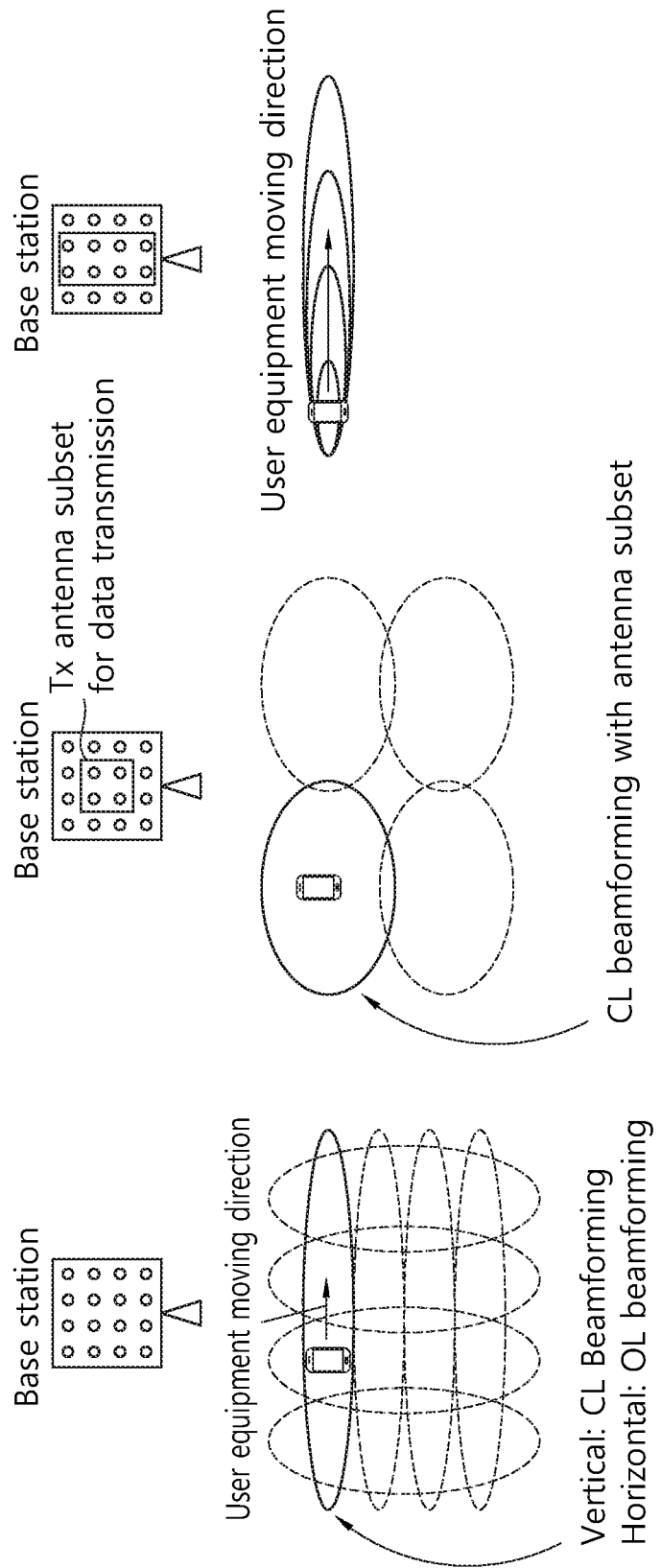
FIG. 6 illustrates an example of the flexible beamforming.

FIG. 6 illustrates an example of the flexible beamforming.

As shown in FIG. 6, the technique is applied to each case that an open loop beamforming is performed in a parallel direction and a closed beamforming is performed in a vertical direction when a moving direction of a user equipment is parallel.

The beam width is wide on the place where the open loop beamforming is performed and the beam width may be adjusted based on the feedback information from the user equipment on the place where the closed loop beamforming is performed. Particularly, a base station may adjust the beam width by $w_n$ of Equation 3.

The moving velocity of the user equipment located in the center of FIG. 6 is smaller than that of the user equipment located in the right side of FIG. 6. Accordingly, the shape of beam formed by an antenna is also different. According to the moving velocity of the user equipment, the size of beam and the width of beam which is formed may be adjusted.

As shown in the right side of FIG. 6, in order to guarantee the movement of the user equipment, the shape of the beam may be adjusted according to the movement of the user equipment.

Figure 7:
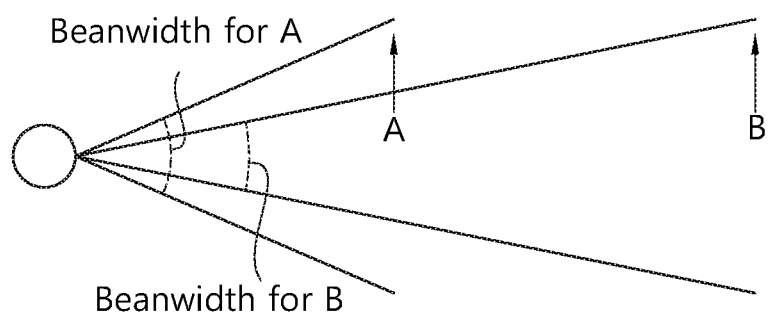
FIG. 7 is a diagram for describing an adjustment of a beam width according to the velocity of a user equipment.

FIG. 7 is a diagram for describing an adjustment of a beam width according to the velocity of a user equipment.

It is characterized that the beam radiated from an antenna spreads wider as the distance from the antenna increases. User equipment A moves vertically to the beam direction in a distance closer to a base station, and user equipment B moves vertically to the beam direction in a distance far away from the base station.

In order to guarantee a signal transmission of user equipment A located close to the base station, which is moving, the beam width provided to user equipment A should be greater than that of user equipment B. That is, in order to guarantee the mobility of the user equipments which are moving near to the base station, the beam width for the interior user equipment should be widely adjusted than the beam width for the user equipment which is far away from the base station.

Meanwhile, the partial frequency reuse technique described above is to mitigate the inter-cell interference by varying the size of a transmission power depending on the resource. According to the technique, since the maximum power is limited for the resource allocate to the interior cell, a signal may not be transmitted with the maximum power of a radio frequency (RF) amplifier for the user equipment in the interior cell.

That is, when the partial frequency reuse technique is used, the performance deterioration may occur for the user equipments located in the interior cell in comparison with the network in which the partial frequency reuse technique is not used. Accordingly, the present invention proposes a method that may mitigate the inter-cell interference while minimizing the performance deterioration of the user equipments located in the interior cell.

As described above, in the huge MIMO system, the flexible beamforming technique in which the position, velocity, etc. of a moving user equipment may be utilized. In the present invention, even for the user equipment that is moving in the same velocity, a wide beam is transmitted to the cell interior resource for the user equipment located in the interior cell.

As such, in the case of widening the beam width transmitted to interior of cell, the peak power of a main lobe may be decreased, and the interference exerted to a neighboring cell may be decreased. That is, in the aspect of the peak power, the present invention may obtain the same effect as decreasing the power of the interior resource in the existing partial frequency reuse technique.

The present invention proposes to widen the beam width intentionally for the interior user equipment in order to improve the performance of the user equipment in a cell-edge. In addition, when a beam width is widen for the interior user equipment, by notifying it to a neighboring cell using the RNTP, the present invention proposes a method for configuring an RNTP value which is applied to improve the performance of the user equipment in a cell-edge. The configuration of the RNTP value is performed by a base station, but the effect therefor leads to the performance gain of the user equipment in a cell-edge.

The information of the peak power of the main lobe according to a beam width and a change of the beam width in an array antenna may be identified through an array factor AF(θ). Since the array factor configures the direction point to zero, the peak power of the main lobe may be obtained when θ is zero.

That is, the maximum AF(θ) is identical to AF(0). In this case, a half power beam width is as Equation 7 below.

$$2\min\left|AF^{-1}\left(\frac{AF(0)}{2}\right)\right|$$ [Equation 7]

In summary, the increase of the beam width and the decrease of the peak power according to it may be represented through AF(θ).

According to an embodiment of the present invention, the restriction information of the RNTP may be determined using the peak power of an antenna array radiation pattern.

In this case, the increase of the beam width causes the decrease of the peak power of the main lobe, which means the decrease of interference that is exerted to a neighboring cell. That is, the RNTP value may be obtained using the array factor AF(θ) that may express the decrease of the peak power. The embodiment therefor is expressed by Equation 8 or Equation 9.

$$RNTP(n_{PRB}) = \begin{cases} 0 & \text{if } AF_{max}(n_{PRB}) \leq RNTP_{threshold} \\ 1 & \text{if } AF_{max}(n_{PRB}) > RNTP_{threshold} \end{cases}$$ [Equation 8]

In Equation 8, $AF_{max}(n_{PRB})$ means the maximum value among AF(0) values of a UE-specific physical downlink shared channel (PDSCH) RE that may be scheduled during a future time interval. $RNTP_{threshold}$ may be expressed by $RNTP_{threshold} \in \{-\infty, a_1, a_2, \ldots a_L\}$.

The case that $RNTP_{threshold}$ is $-\infty$ may mean that the inter-cell interference control is not performed using the RNTP. $a_L$ may be determined by considering an inter site distance, an antenna configuration, a traffic load distribution, and the like.

According to Equation 8, the RNTP value becomes 0 when $AF_{max}(n_{PRB})$ is equal to or smaller than a specific $RNTP_{threshold}$, and becomes 1 when $AF_{max}(n_{PRB})$ is greater than a specific $RNTP_{threshold}$.

Generally, since the increase of the beam width means the decrease of the peak power of the main lobe, the RNTP value may be determined according to the beam width. The criteria for determining the beam width may be the beam width of the main lobe or the HPBW. Equation 9 represents an embodiment of obtaining the RNTP value using the HPBW.

$$RNTP(n_{PRB}) = \begin{cases} 0 & \text{if } HPBW_{max}(n_{PRB}) \geq RNTP_{threshold} \\ 1 & \text{if } HPBW_{max}(n_{PRB}) < RNTP_{threshold} \end{cases}$$ [Equation 9]

In Equation 9, $HPBW_{max}(n_{PRB})$ means the maximum value among HPBW values of a UE-specific physical downlink shared channel (PDSCH) RE that may be scheduled during a future time interval. $RNTP_{threshold}$ may be expressed by $RNTP_{threshold} \in \{a_1, a_2, \ldots a_L, 360\}$.

Since the radiation angle of an actual antenna is smaller than 360 degrees, the case that $RNTP_{threshold}$ is 360 may mean the inter-cell interference control is not performed using the RNTP.

According to another embodiment of the present invention, since the beam gain of the beam radiated from an antenna array is the multiplication of an AF by the radiation pattern of a single antenna as shown in FIG. 5, in order to anticipate the interference more accurately, the RNTP value may be determined by multiplication of the radiation pattern of a single antenna ($E_r(ω)$) by AF(θ).

That is, according to an embodiment of the present invention, the restriction information of the RNTP is determined by using the maximum value of the multiplication of the antenna array radiation pattern by the single antenna gain.

In the case that the antenna array radiation pattern is multiplied by AF, depending on the direction that a beam is directing, the maximum value of $E_r(ω)AF(θ)$, which is the antenna gain, is not occurred when θ is zero. Accordingly, $E_r(x+y)AF(y)$, which is the maximum value between $-π<x≤π$ and $-π<x≤π$ is determined as the antenna gain, that is, $$AG = \max_{-π<x≤y≤π} E_r(x+y)AF(y),$$

and using it, the RNTP value may be determined. This is expressed by Equation as follows.

$$RNTP(n_{PRB}) = \begin{cases} 0 & \text{if } AG_{max}(n_{PRB}) \leq RNTP_{threshold} \\ 1 & \text{if } AG_{max}(n_{PRB}) > RNTP_{threshold} \end{cases}$$ [Equation 10]

In Equation 10, $AG_{max}(n_{PRB})$ means the maximum value among AG values of a UE-specific physical downlink shared channel (PDSCH) RE that may be scheduled during a future time interval. $RNTP_{threshold}$ may be expressed by $RNTP_{threshold} \in \{-\infty, a_1, a_2, \ldots a_L\}$.

The case that $RNTP_{threshold}$ is $-\infty$ may mean that the inter-cell interference control is not performed using the RNTP.

Meanwhile, as represented in Equation 10, the complexity may be increased when the maximum value is obtained by multiplying the radiation pattern of a single antenna by AF. According to anther embodiment of the present invention, in order to decrease the complexity in calculation, the antenna gain AG may be configured as $E_r(x)AF(0)$, and the RNTP value may be determined. Here, x represents the angle of beam bent as a reference of bore sight.

When a base station transmits a signal with the same power in the interior area of a cell and the cell-edge of a cell, the RNTP value may be determined according to Equation 8 to Equation 10 described above.

Meanwhile, in the case that a beam of wide width is transmitted to a user equipment in a cell-edge using the flexible beamforming, the size of a reception power may become significantly smaller. In addition, in the case that a beam width is wide although the peak power of a main robe is the same, the amount of interference that exerts to a neighboring cell may become greater.

According to another embodiment of the present invention, in order to overcome the decrease of a reception power, a signal may be transmitted by amplifying the power of a wide beam width. In this case, the RNTP value may be determined by using both of an antenna gain and an EPRE. That is, according to an example of the present invention, the restriction information of the RNTP may be determined by using the maximum value multiplying an antenna array radiation pattern, a single antenna gain and an EPRE.

In the case of the AG obtained according to Equation 10, when a beam width is wide, the amount change of generated interference such as the increase of the amount of interference that exerts to a neighboring cell may not be expressed.

However, when the EPRE of a user equipment is multiplied according to an embodiment of the present invention, the amount of interference that exerts to a neighboring cell may be accurately measured since the value of AG multiplied by the EPRE has greater value in the case that a beam width is great even though the peak power of a main robe is the same. The Equation for determining the RNTP by considering an amount of generated interference according to a beam width is as follows.

$$RNTP(n_{PRB}) = \begin{cases} 0 & \text{if } \frac{E_{AG}(n_{PRB})}{E_{max\_nom}^{(p)}} \leq RNTP_{threshold} \\ & \text{if no promise about the upper} \\ 1 & \text{limit of } \frac{E_{AG}(n_{PRB})}{E_{max\_nom}^{(p)}} \text{ is made} \end{cases} \quad [\text{Equation 11}]$$

In Equation 11, $E_{AG}(n_{PRB})$ means the maximum value among AG×EPRE values of a UE-specific physical downlink shared channel (PDSCH) RE that may be scheduled during a future time interval. $RNTP_{threshold}$ may be expressed by $RNTP_{threshold} \in \{-\infty, a_1, a_2, \ldots a_L\}$.

The case that $RNTP_{threshold}$ is $-\infty$ may mean that the inter-cell interference control is not performed using the RNTP.

Meanwhile, according to another embodiment of the present invention, in order to more accurately measure an amount of interference of a neighboring cell of the signal radiated by a base station than Equation 11 using the AG multiplied by the EPRE, the RNTP value may be determined by using a weighted antenna gain (wAG) that is weights for a beam width when the AG is calculated. This is expressed by Equation as follows.

$$RNTP(n_{PRB}) = \begin{cases} 0 & \text{if } wAG_{max}(n_{PRB}) \leq RNTP_{threshold} \\ 1 & \text{if } wAG_{max}(n_{PRB}) > RNTP_{threshold} \end{cases} \quad [\text{Equation 12}]$$

In Equation 12, $wAG_{max}(n_{PRB})$ means the maximum value among AG×HPBW values of a UE-specific physical downlink shared channel (PDSCH) RE that may be scheduled during a future time interval. $RNTP_{threshold}$ may be expressed by $RNTP_{threshold} \in \{-\infty, a_1, a_2, \ldots a_L\}$.

The case that $RNTP_{threshold}$ is $-\infty$ may mean that the inter-cell interference control is not performed using the RNTP.

Figure 8:
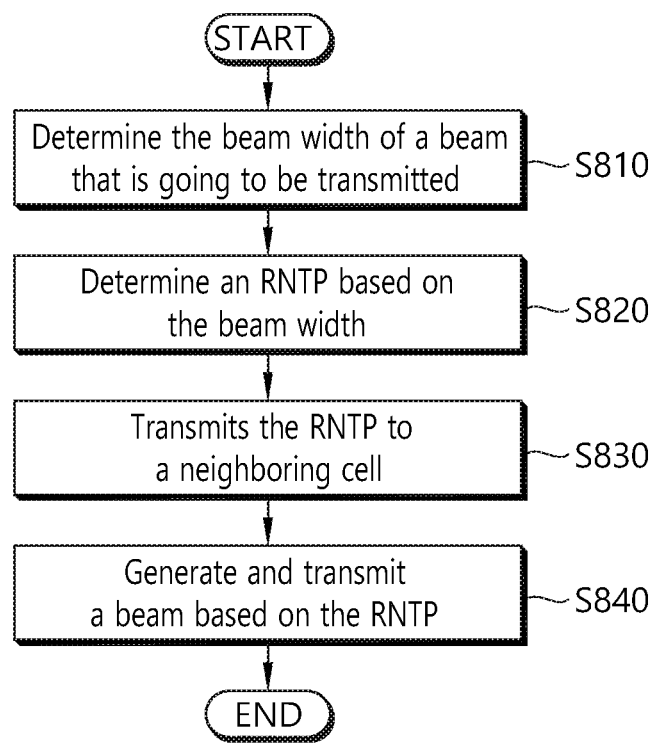
FIG. 8 is a diagram for describing a signal transmission method according to an embodiment of the present invention.

FIG. 8 is a diagram for describing a signal transmission method according to an embodiment of the present invention.

Referring to FIG. 8, an RNTP determination method and a signal transmission method according to it are described as follows.

First, a signal transmission device such as a base station that may transmit a signal to a user equipment determines the beam width of a beam that is going to be transmitted (S810).

In the case that the partial frequency reuse technique is used, in order to secure the mobility of users located in a cell interior, the base station may increase the beam width that is going to be transmitted to the cell interior. The increase of beam width causes the decrease of a peak power. Such a decrease of a peak power has an effect of decreasing the interference that exerts to a neighboring cell.

The base station may determine an RNTP based on the beam width (S820).

The RNTP information that is expressed as an RNTP indicator or an RNTP value may represent whether the transmission power for a specific resource block of a cell is maintained below a specific upper limit, and therefore, may represent whether the base station transmits a signal in a cell-edge.

The base station may determine the RNTP information using an array factor. In this case, the base station may calculate the array factor that includes the beam width and the information of the peak power according to the beam width.

The base station may determine the RNTP to be either one of 0 or 1 by comparing the calculated array factor with the preconfigured array factor.

According to another embodiment, the base station may also determine the RNTP by comparing the half power beam width in which the maximum power of a beam becomes a half with the preconfigured half power beam width.

Otherwise, the base station may determine the RNTP information using the array gain for a beam. The array gain may be derived by multiplying a single antenna gain for transmitting a beam by the array factor, and the base station may determine the RNTP to be either one of 0 or 1 by comparing the calculated array gain with the preconfigured array gain.

According to another embodiment, the base station may calculate the gain energy that is induced by the multiplication of the array gain for the beam by the maximum energy for a resource block, and may also determine the RNTP using the gain energy calculated as such.

The base station may determine the RNTP to be either one of 0 or 1 by comparing the gain energy with the preconfigured gain energy.

In this case, in order to more accurately measure an amount of interference of a neighboring cell of the radiated signal, the base station may attribute weighting to a beam width when the AG is calculated.

As such, when the RNTP is determined by the various conditions and calculations, the base station transmits the determined RNTP to a neighboring cell (S830).

Since the case that the RNTP is 1 may represent that a transmission power is maintained in a specific resource block, that is, a signal is transmitted, the neighboring cell that receives it may not allocate a signal to the specific resource block. On the contrary, since the case that the RNTP is 0 may represent that a signal is not transmitted to the corresponding resource block, the neighboring cell that receives it may allocate a signal to the specific resource block.

The base station may generate a beam based on the determined RNTP. When the RNTP is generated, the base station may transmit it (S840).

As such, the base station may increase the utilization of the partial frequency reuse technique by determining whether to perform beamforming based on the RNTP, and notifying it to a neighboring cell. The RNTP for determining beamforming may be determined by the beam width for securing the mobility of a user equipment existed in the interior of a cell, and the array factor and/or the antenna gain, and the like may be used for the factor for determining the RNTP.

Figure 9:
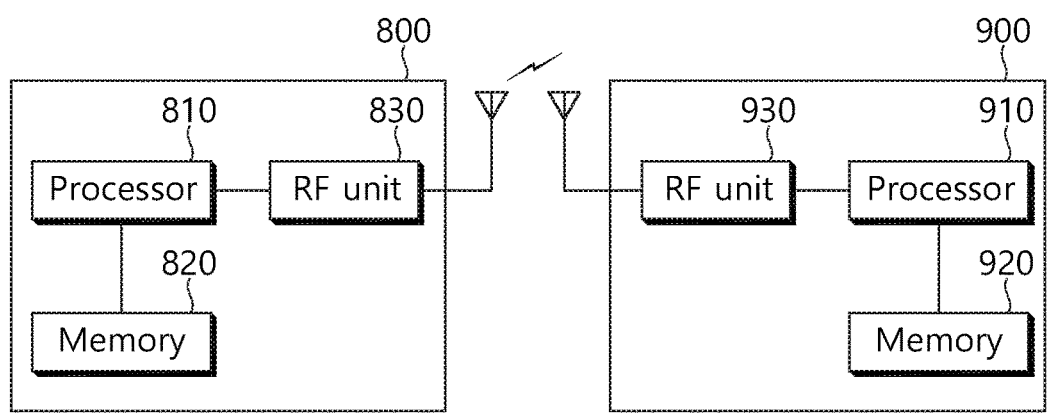
FIG. 9 is a block diagram illustrating a wireless communication system according to the present invention.

FIG. 9 is a block diagram of a wireless communication system according to an embodiment of the present invention.

The base station 800 includes a processor 810, a memory 820, and an RF (radio frequency) unit 830. The processor 810 implements functions, processes, and/or methods as suggested herein. The layers of a wireless interface protocol may be implemented by the processor 810. The memory 820 is connected with the processor 810 and stores various pieces of information for driving the processor 810. The RF unit 830 is connected with the processor 810 and transmits and/or receives radio signals.

The wireless device 900 includes a processor 910, a memory 920, and an RF unit 930. The processor 910 implements functions, processes, and/or methods as suggested herein. The layers of a wireless interface protocol may be implemented by the processor 910. The memory 920 is connected with the processor 910 and stores various pieces of information for driving the processor 910. The RF unit 930 is connected with the processor 910 and transmits and/or receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

As described above, the present invention proposes a method for configuring a relative narrowband transmit power (RNTP) value for performing an inter-cell interference control in a communication system in which the flexible beamforming is applied.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

The embodiments described above may include various aspects of examples. Although it is not possible to describe all available combinations for representing various aspects, those ordinary skilled in the art may understand that other various combinations are available. Accordingly, it is understood that the present invention includes all of other alternations, modifications and changes that are belonged to the claims below.

What is claimed is:

1. A method for transmitting relative narrowband transmit power (RNTP) information, the method comprising:
   determining a beam width that is going to be transmitted;
   determining, based on the beam width, the RNTP information, the RNTP information representing whether a transmission power greater than a preconfigured threshold value is transmitted on a preconfigured resource block;
   transmitting the RNTP information; and
   transmitting a generated beam on the preconfigured resource block according to the RNTP information.

2. The method of claim 1, further comprising calculating an array factor that includes the beam width and information of a change of a maximum antenna gain according to the beam width,
   wherein determining the RNTP information is determined by comparing the array factor with a preconfigured array factor.

3. The method of claim 1, wherein determining the RNTP information is determined by comparing a half power beam width in which a maximum power of a beam becomes a half with a preconfigured half power beam width.

4. The method of claim 1, further comprising:
   calculating an antenna gain for the beam,
   wherein determining the RNTP information is determined by comparing the antenna gain with a preconfigured array gain.

5. The method of claim 4, wherein calculating the antenna gain for the beam performs a multiplication of a single antenna gain for transmitting a beam by the beam width and an array factor that includes information of change of a maximum antenna gain according to the beam width.

6. The method of claim 1, further comprising:
   calculating a gain energy by a multiplication of an antenna gain for the beam by a maximum energy for a resource block,
   wherein determining the RNTP information is determined by comparing the gain energy with a preconfigured gain energy.

7. The method of claim 6, wherein the antenna gain is calculated by performing a multiplication of a single antenna gain for transmitting the beam by the beam width and an array factor that includes information of change of a maximum antenna gain according to the beam width.

8. The method of claim 6, wherein a weighting is attributed to the antenna gain in calculating the gain energy.

9. A device for transmitting relative narrowband transmit power (RNTP) information, the device comprising:
   a signal transceiver; and
   a processor connected with the signal transceiver,
   wherein the processor is configured for:
      determining a beam width that is going to be transmitted;
      determining, based on the beam width, the RNTP information, the RNTP information representing whether a transmission power greater than a preconfigured threshold value is transmitted on a preconfigured resource block;
      transmitting the RNTP information; and
      transmitting a generated beam on the preconfigured resource block according to the RNTP information.

* * * * *